United States Patent
Li et al.

(10) Patent No.: US 9,260,625 B2
(45) Date of Patent: Feb. 16, 2016

(54) WATER-BASED COATING COMPOSITIONS

(71) Applicant: AKZO NOBEL COATINGS INTERNATIONAL B.V., Arnhem (NL)

(72) Inventors: Cathy Li, Solon, OH (US); Timothy I Memmer, Strongsville, OH (US); Daniel Bode, Cleveland, OH (US); Stefan Posakiwsky, Valley View, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/365,886

(22) PCT Filed: Dec. 18, 2012

(86) PCT No.: PCT/EP2012/075873
§ 371 (c)(1),
(2) Date: Jun. 16, 2014

(87) PCT Pub. No.: WO2013/092539
PCT Pub. Date: Jun. 27, 2013

(65) Prior Publication Data
US 2014/0309338 A1    Oct. 16, 2014

Related U.S. Application Data

(60) Provisional application No. 61/578,479, filed on Dec. 21, 2011.

(30) Foreign Application Priority Data

Jan. 5, 2012   (EP) ..................... 12150244

(51) Int. Cl.
| | |
|---|---|
| C09D 151/00 | (2006.01) |
| C08F 289/00 | (2006.01) |
| C09D 151/08 | (2006.01) |
| C09D 191/00 | (2006.01) |
| C08L 51/00 | (2006.01) |
| C08L 91/00 | (2006.01) |

(52) U.S. Cl.
CPC .......... C09D 151/003 (2013.01); C08F 289/00 (2013.01); C09D 151/08 (2013.01); C09D 191/00 (2013.01); C08L 51/00 (2013.01); C08L 91/00 (2013.01)

(58) Field of Classification Search
CPC .... C08F 255/00; C08F 255/02; C08F 289/00; C08L 51/00; C08L 91/00; C09D 151/00; C09D 151/003; C09D 151/02; C09D 151/08; C09D 191/00
See application file for complete search history.

(56) References Cited

U.S. PATENT DOCUMENTS

| | | |
|---|---|---|
| 2,967,162 A | 1/1961 | Vasta |
| 3,125,592 A | 3/1964 | Nevin et al. |
| 3,248,356 A | 4/1966 | Snyder |
| 3,424,766 A | 1/1969 | Masters |
| 3,647,520 A | 3/1972 | Gor et al. |
| 3,699,061 A | 10/1972 | Cunningham et al. |
| 3,827,993 A | 8/1974 | Cunningham et al. |
| 3,912,670 A | 10/1975 | Huemmer et al. |
| 4,012,559 A | 3/1977 | Fujioka et al. |
| 4,025,477 A | 5/1977 | Borden et al. |
| 4,025,548 A | 5/1977 | Huemmer et al. |
| 4,199,622 A | 4/1980 | Kokumai et al. |
| 4,212,781 A | 7/1980 | Evans et al. |
| 4,264,483 A | 4/1981 | Laufer et al. |
| 4,333,865 A | 6/1982 | Zückert |
| 4,377,457 A | 3/1983 | Boeckeler et al. |
| 4,425,450 A | 1/1984 | Horvath |
| 4,522,961 A | 6/1985 | Martino et al. |
| 4,543,430 A | 9/1985 | Falgoux et al. |
| 4,657,781 A | 4/1987 | Nicco et al. |
| 4,707,535 A | 11/1987 | Koleske |
| 4,829,124 A | 5/1989 | Clark |
| 4,886,893 A | 12/1989 | Meffert et al. |

(Continued)

FOREIGN PATENT DOCUMENTS

| | | |
|---|---|---|
| CN | 1693396 A | 11/2005 |
| CN | 101195577 A | 6/2008 |

(Continued)

OTHER PUBLICATIONS

European Search Report dated May 14, 2012 for Application No. EP 12 15 0244.7.

(Continued)

*Primary Examiner* — Irina S Zemel
*Assistant Examiner* — Jeffrey Lenihan

(57) ABSTRACT

Coating compositions are disclosed. In some embodiments, the coating compositions are used to coat substrates such as packaging materials and the like for the storage of food and beverages. The coating compositions can be prepared by reacting an epoxidized vegetable oil and a hydroxyl functional material in the presence of an acid catalyst to form a hydroxyl functional oil polyol, mixing the hydroxyl functional oil polyol (with or without epoxidized polybutadiene) and a functional polyolefin copolymer to form a mixture, reacting the mixture with an ethylenically unsaturated monomer component in the presence of an initiator to form a graft copolymer, and crosslinking the graft copolymer with a crosslinker to form the coating composition, wherein the graft copolymer or the crosslinked graft copolymer is inverted into water.

20 Claims, No Drawings

(56) References Cited

U.S. PATENT DOCUMENTS

| | | |
|---|---|---|
| 4,959,271 A | 9/1990 | Sun |
| 5,043,380 A | 8/1991 | Cole |
| 5,318,808 A | 6/1994 | Crivello et al. |
| 5,380,886 A | 1/1995 | Daute et al. |
| 5,686,140 A | 11/1997 | Stoffel |
| 5,714,539 A | 2/1998 | Perez et al. |
| 5,728,796 A | 3/1998 | Liao et al. |
| 5,733,970 A | 3/1998 | Craun |
| 6,001,898 A | 12/1999 | Lutz |
| 6,197,878 B1 | 3/2001 | Murray et al. |
| 6,399,672 B1 | 6/2002 | Ceska et al. |
| 6,433,125 B1 | 8/2002 | Gruetzmacher et al. |
| 6,573,354 B1 | 6/2003 | Petrovic et al. |
| 6,686,435 B1 | 2/2004 | Petrovic et al. |
| 6,924,377 B2 | 8/2005 | Blazecka et al. |
| 7,192,992 B2 | 3/2007 | Ramsey |
| 7,645,521 B2 | 1/2010 | Wevers et al. |
| 7,745,508 B2 | 6/2010 | Kiefer-Liptak et al. |
| 7,868,085 B2 | 1/2011 | Lamers et al. |
| 2001/0036999 A1 | 11/2001 | Yokoyama et al. |
| 2002/0147270 A1 | 10/2002 | Kuo et al. |
| 2002/0151626 A1 | 10/2002 | Isaka |
| 2003/0004231 A1 | 1/2003 | Ehmann et al. |
| 2003/0064185 A1 | 4/2003 | Mazza et al. |
| 2003/0148257 A1 | 8/2003 | Berkowitz et al. |
| 2003/0187128 A1 | 10/2003 | Shiba et al. |
| 2003/0236415 A1 | 12/2003 | Blazecka et al. |
| 2004/0097611 A1 | 5/2004 | Nienhaus et al. |
| 2004/0180933 A1 | 9/2004 | Brown et al. |
| 2005/0209361 A1 | 9/2005 | Detrembleur et al. |
| 2006/0116501 A1 | 6/2006 | Mager et al. |
| 2007/0017440 A1 | 1/2007 | Tang et al. |
| 2007/0036903 A1 | 2/2007 | Mayr et al. |
| 2008/0108728 A1 | 5/2008 | White et al. |
| 2008/0220267 A1 | 9/2008 | Howell et al. |
| 2008/0299343 A1 | 12/2008 | Wogt et al. |
| 2008/0302694 A1 | 12/2008 | Gardner et al. |
| 2010/0055467 A1 | 3/2010 | Kulfan et al. |
| 2010/0093913 A1 | 4/2010 | Jones et al. |
| 2010/0190951 A1 | 7/2010 | Suppes et al. |
| 2010/0217022 A1 | 8/2010 | Abraham et al. |
| 2010/0292492 A1 | 11/2010 | Geng et al. |
| 2011/0195263 A1 | 8/2011 | Malotky et al. |
| 2011/0207850 A1 | 8/2011 | Kan et al. |
| 2011/0294946 A1 | 12/2011 | Craun et al. |
| 2012/0022186 A1 | 1/2012 | Craun et al. |
| 2014/0364537 A1 | 12/2014 | Li et al. |

FOREIGN PATENT DOCUMENTS

| | | |
|---|---|---|
| CN | 101225141 A | 7/2008 |
| CN | 101243036 A | 8/2008 |
| DE | 102 25 367 C1 | 9/2003 |
| EP | 0 329 027 A2 | 8/1989 |
| EP | 0 493 916 B2 | 3/1997 |
| GB | 1100569 | 1/1968 |
| GB | 2 052 526 A | 1/1981 |
| GB | 1 597 610 | 9/1981 |
| GB | 2 100 271 A | 12/1982 |
| GB | 2 197 654 A | 5/1988 |
| GB | 2 218 704 A | 11/1989 |
| GB | 2 305 919 A | 4/1997 |
| GB | 2 428 678 A | 2/2007 |
| GB | 2 428 678 B | 1/2010 |
| JP | S55-120613 A | 9/1980 |
| JP | S58-021411 A | 2/1983 |
| JP | S58-185604 A | 10/1983 |
| JP | S60-047074 A | 3/1985 |
| JP | S60-156707 A | 8/1985 |
| JP | S60-156708 A | 8/1985 |
| JP | S63-112670 A | 5/1988 |
| JP | H02-092916 A | 4/1990 |
| JP | H02-232219 A | 9/1990 |
| JP | H03-091579 A | 4/1991 |
| JP | H09-183940 A | 7/1997 |
| JP | H11-140160 A | 5/1999 |
| JP | 2002-533540 A | 10/2002 |
| JP | 2004-250505 A | 9/2004 |
| JP | 2008-156595 A | 7/2008 |
| RU | 2 391 368 C1 | 6/2010 |
| WO | 94/12554 A1 | 6/1994 |
| WO | 96/20234 A1 | 7/1996 |
| WO | 00/11068 A1 | 3/2000 |
| WO | 01/12711 A1 | 2/2001 |
| WO | 01/23471 A1 | 4/2001 |
| WO | 03/089479 A2 | 10/2003 |
| WO | 2004/096882 A1 | 11/2004 |
| WO | 2005/033167 A2 | 4/2005 |
| WO | 2006/012344 A1 | 2/2006 |
| WO | 2006/045017 A1 | 4/2006 |
| WO | 2006/096321 A2 | 9/2006 |
| WO | 2006/138637 A1 | 12/2006 |
| WO | 2007/127379 A1 | 11/2007 |
| WO | 2008/134217 A1 | 11/2008 |
| WO | 2008/151286 A1 | 12/2008 |
| WO | 2009/007296 A1 | 1/2009 |
| WO | 2009/137014 A1 | 11/2009 |
| WO | 2010/019180 A1 | 2/2010 |
| WO | 2010/062844 A1 | 6/2010 |
| WO | 2010/097353 A1 | 9/2010 |
| WO | 2010/100121 A1 | 9/2010 |
| WO | 2010/100122 A1 | 9/2010 |
| WO | 2010/114648 A1 | 10/2010 |
| WO | 2011/009024 A1 | 1/2011 |
| WO | 2011/011705 A2 | 1/2011 |
| WO | 2011/011707 A2 | 1/2011 |
| WO | 2012/089655 A2 | 7/2012 |
| WO | 2012/089657 A2 | 7/2012 |
| WO | 2013/092541 A1 | 6/2013 |

OTHER PUBLICATIONS

Notification of Transmittal of the International Search Report and the Written Opinion of the International Searching Authority, or the Declaration from the International Bureau of WIPO for International Application No. PCT/EP2012/075873 dated Feb. 27, 2013.

Derwent abstract for CN 1693396 A, XP-002674905, publication date Nov. 19, 2005.

"Acid strength," Wikipedia, the free encyclopedia, p. 1-9, Jun. 15, 2012.

Dahlke et al., "Polyhydroxy Fatty Acids and Their Derivatives from Plant Oils," JAOCS, vol. 72, No. 3 (1995), p. 349-353.

Diehl et al., "Waterborne Mechanical Dispersions of Polyolefins," The Dow Chemical Co., MRS 2004 Fall Meeting Proceeding: vol. 838E O10.19, p. 1-14.

Guo et al., "Hydrolysis of Epoxidized Soybean Oil in the Presence of Phosphoric Acid," J Am Oil Chem Soc., vol. 84 (2007), p. 929-935.

Guo et al., "Rigid Polyurethane Foams Based on Soybean Oil," Journal of Applied Polymer Science, vol. 77 (2000), 3 pages.

Ionescu et al., "Ethoxylated Soybean Polyols for Polyurethanes," J Polym Environ, vol. 15 (2007), pp. 237-243.

Men'Shikova et a., "Synthesis of Carboxylated Monodisperse Latexes and Their Self-Organization in Thin Films," Russian Jour of App Chem, vol. 78, No. 1, 2005, p. 159-165.

Norakankorn et al., "Synthesis of core/shell structure of glycidyl-functionalized . . . polymerization," Euro Polym Jour 45 (2009), p. 2977-2986.

Mishra et al., "Synthesis and Characterization of Butyl Acrylate/Methyl Methacrylate/Glycidyl Methacrylate Latexes," Jour App Polym Science, vol. 115 (2010), p. 549-557.

Kiplinger, Jon, "Phosphate polymerizable adhesion promoters.," JCT Coatings Tech, Feb. 1, 2005, 11 pages.

"Lewis acids and bases," Wikipedia, the free encyclopedia, p. 1-7, Jun. 15, 2012.

Mannari et al., "Two-Component High-Solid Polyurethane Coating Systems Based on Soy Polyols," JCT Research, vol. 3, No. 2, p. 151-157, Apr. 2006.

"Trifluoromethanesulfonate," Wikipedia, the free encyclopedia, p. 1-3, Jun. 5, 2012.

(56) References Cited

OTHER PUBLICATIONS

Tullo, Alexander H., "Paints from Plants," www.Cen-Online.Org, Chemical & Engineering News, Northeast News Bureau, p. 16-19, Apr. 12, 2010.

Zhong et al., "Novel Coatings From Soybean Oil Phosphate Ester Polyols," Coatings Research Institute/Eastern Michigan Univ., vol. 73, No. 915, p. 53-57, Apr. 2001.

"Trifluoroacetic acid," GPS Safety Summary, Phodia: Member of the Solvay Group, Dec. 2012.

Pka data, www.ochemonline.com, Sep. 2010.

"Trifluoroacetic acid," Wikipedia, the free encyclopedia, 4 pages, May 2014.

"Zinc trifluoromethanesulfonate," Wikipedia, the free encyclopedia, Mar. 2013.

Derwent abstract No. 2009-A35572 for Chinese Patent No. 101195577 A, Jun. 11, 2008, Dou, Li and Wang, 2 pages.

Rakita, "Triflic acid and its derivatives. A family of useful reagents for synthesis," Fluorine Chemistry, chimica oggi, Chemistry Today, Mar./Apr. 2004, pp. 48-50.

M.S. Ibrahim et al., "Development of Radiation curable surface coating based on soybean oil.," 8th ARAB Internationalconference on Polymer Science and Technology, 13 pages, Nov. 27-30, 2005.

WATER-BASED COATING COMPOSITIONS

BACKGROUND OF THE INVENTION

1. Field of the Invention

The present invention relates to coating compositions, methods of coating substrates with the coating compositions, and substrates coated with the coating compositions.

2. Description of Related Art

Current art is primarily based on epoxy resin technology cured with amino resins and phenolics. Coating compositions formed from bisphenol A based epoxy resins and polyvinyl chloride have been used to coat packaging and containers for foods and beverages. However, there is a desire among some consumers and brand owners for coating compositions free, or substantially free, of bisphenol A and polyvinyl chloride for packaging and containers for food and beverages.

Commonly-owned patent publication WO 2010/100122 discloses a coating composition comprising a hydroxyl functional oil polyol prepared by a method comprising reacting an epoxidized vegetable oil with a hydroxyl functional material in the presence of an acid catalyst. Commonly-owned patent publication WO 2010/100121 discloses a coating composition comprising a hydroxyl functional oil polyol acrylic graft copolymer prepared by a method comprising reacting an epoxidized vegetable oil with a hydroxyl functional material in the presence of an acid catalyst to form a hydroxyl functional oil polyol, reacting the hydroxyl functional oil polyol with an ethylenically unsaturated monomer component in the presence of an initiator to form a hydroxyl functional oil polyol acrylic graft copolymer, and crosslinking the hydroxyl functional oil polyol acrylic graft copolymer with a crosslinker to form the coating composition. However, some oil polyol technology does not have intrinsically good flexibility and can benefit from further modification when the material is to be used as a packaging coating composition.

UK patent application GB 2218704 disclosed an aluminum or tinned-steel can for carbonated beverages protected by an aqueous coating formulation of a polyethylene-maleic acid copolymer. The aqueous solution as applied preferably contains from 5-20% by weight solids which is too low for beverage can-ends applications. Also, the coating applied to the substrate was heat-cured at 200° C. for 10 minutes which is too long and not applicable for can-ends applications.

There is a desire to produce packaging coating compositions that do not contain bisphenol A or polyvinyl chloride or are substantially free of the same. The coating compositions of the invention can be used, inter alia, as packaging coatings for food and beverage packaging and containers. They can be formulated to provide higher solids for application and improved toughness, corrosion resistance, flexibility, blush resistance and retort resistance compared to some commercial coating compositions.

SUMMARY OF THE INVENTION

The technology of the present invention has the capability of providing a wide range of solids coatings for both external and interior beverage can-ends applications and comparable toughness, corrosion resistance, flexibility, blush resistance and retort resistance with some of the coatings of the current art. A higher solid allows broader coating latitude in a single pass operation. Some coating compositions have 20% or more of a renewable oil polyol which contributes to sustainability and meets the needs of global consumers. The functional polyolefin copolymers of this invention help provide good flexibility to maintain film integrity in the beverage ends conversion press and provide good adhesion to the metal substrates.

Easy-open-ends for beer and beverage cans are typically manufactured by first coating a flat sheet of a metal substrate, heating the coated substrate, and then stamping or shaping the coated substrate into the desired shape. High speed coil coating lines often require a coating composition that will dry and cure within a few seconds since the substrate is heated very rapidly to a peak metal temperature that can range from about 200 to about 300° C. Beverage ends conversion presses often contain multiple "progressive" die sets which raise a "rivet" in the center of shell, scores, field and deboss. The multiple "progressive" die sets require the coating film to have at least a 300% elongation. The coating compositions of the present invention can be applied on beer and beverage can ends and may be applied in film weights of about 1 milligram per square inch to about 10 milligrams per square inch on a high speed coil coating line.

The present invention provides an alternate to epoxy resin-based coating compositions that still allows formaldehyde free cure, blush resistance, capability to retort and can withstand hard-to-hold beverages. The present invention includes processes for producing coating compositions, such as water-based coating compositions, and coating compositions formed by such processes. Such processes can be performed in a single reactor or in multiple reactors. In some embodiments of the invention, a coating composition is prepared by a method comprising the steps of reacting an epoxidized vegetable oil with a hydroxyl functional material in the presence of an acid catalyst (such as a Lewis acid catalyst) to form a hydroxyl functional oil polyol, mixing the hydroxyl functional oil polyol with a functional polyolefin copolymer (with or without epoxidized polybutadiene) to form a mixture, reacting the mixture with an ethylenically unsaturated monomer component in the presence of an initiator to form a graft copolymer; and crosslinking the graft copolymer to form the coating composition (throughout this application, it should be understood that the coating composition may be prepared by inverting the graft copolymer or the crosslinked graft copolymer into water).

In some embodiments of the invention, a coating composition is prepared by a method comprising mixing a hydroxyl functional oil polyol (with or without epoxidized polybutadiene) and a polyethylene (meth)acrylic acid copolymer in the presence of an acid catalyst (such as a Lewis acid catalyst) to form a mixture, and then grafting an ethylenically unsaturated monomer component in the presence of an initiator to form a graft copolymer.

In some embodiments of the invention, a coating composition is prepared by mixing a hydroxyl functional oil polyol and a polyethylene (meth)acrylic acid copolymer (with or without epoxidized polybutadiene) to form a mixture, then grafting an ethylenically unsaturated monomer component to form a graft copolymer and reacting the graft copolymer with a BPA free epoxide crosslinker to form an aqueous microgel polymeric coating composition useful in can coating applications.

The hydroxyl functional oil polyol in a solvent can dissolve the functional polyolefin copolymer at a high temperature (such as 140° C.). The ethylenically unsaturated monomer component, such as styrene or butyl acrylate, can be polymerized in the presence of an initiator. Acrylic monomers can be grafted onto the oil polyol backbone or onto the formed acrylic copolymers. It was discovered that polyethylene acid as a functional polyolefin copolymer was more compatible with an acrylate polymer in the presence of an oil polyol, and that the polyethylene acid provided good adhesion and flexibility for film performance. The functional polyolefin copolymer sometimes had a separate phase with the acrylate polymer and produced a hazy film without the presence of the oil polyol.

In some embodiments of the invention, the coating polymers formed from epoxidized polybutadiene, such as polybd600 in a solvent, can dissolve a polyethylene acid copolymer at a high temperature (such as 140° C.). An ethylenically unsaturated monomer component, such as styrene or butyl acrylate, can be polymerized in the presence of an initiator. Acrylic monomers can be grafted onto the epoxidized polybutadiene backbone or onto the formed acrylic copolymers. Epoxidized polybutadiene has an epoxy group and an unsaturated group. The epoxy group can react with an acid group of polyethylene acid and the unsaturated group can react with the ethylenically unsaturated monomer component and crosslinked to form a coating composition using crosslinkers such as phenolic crosslinkers and BPA-free epoxy-based crosslinkers.

The coating polymers formed from the oil polyol, the functional polyolefin copolymer and the ethylenically unsaturated monomer component can be crosslinked to form a coating composition using crosslinkers such as phenolic crosslinkers and BPA-free epoxy-based crosslinkers. The coating compositions of the present invention exhibit very good film performance when coated on substrates, such as beer and beverage easy-open-ends.

In some embodiments, the present invention includes methods of coating a substrate by applying the coating composition to the substrate. Substrates coated with the coating compositions are also disclosed. In some embodiments, the substrate is a can or packaging.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

The present invention includes substrates coated at least in part with a coating composition of the invention and methods for coating the substrates. The term "substrate" as used herein includes, without limitation, cans, metal cans, easy-open-ends, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of food and beverages.

The present invention includes methods for preparing coating compositions by reacting an epoxidized vegetable oil with a hydroxyl functional material in the presence of an acid catalyst to form a hydroxyl functional oil polyol, mixing the hydroxyl functional oil polyol (with or without epoxidized polybutadiene) and a functional polyolefin copolymer to form a mixture, reacting the mixture with an ethylenically unsaturated monomer component in the presence of an initiator to form a graft copolymer, and crosslinking the graft copolymer with a crosslinker to form the coating composition, wherein the graft copolymer or the crosslinked graft copolymer is inverted into water. The coating compositions can be used, inter alia, in the preparation of packaging coatings for food and beverage packaging and containers.

In some embodiments of the invention, a coating composition is prepared by a method comprising reacting a hydroxyl functional oil polyol (with or without epoxidized polybutadiene, such as polybd600 or polybd605 available from Cray Valley), a polyethylene (meth)acrylic acid copolymer and an ethylenically unsaturated monomer component in the presence of an acid catalyst (such as a Lewis acid catalyst) an initiator to form a graft copolymer, and crosslinking the graft copolymer with a crosslinker to form the coating composition, wherein the graft copolymer or the crosslinked graft copolymer is inverted into water.

In some embodiments of the invention, the coating composition is a water-based coating composition. The water-based coating compositions may contain a non-functional and/or a hydroxyl functional monomer, optionally with higher levels of an acid functional monomer to produce stable water dispersions. For non-limiting example, the water-based coating composition can include an ethylenically unsaturated monomer component having non-functional ethylenically unsaturated monomers such as, for non-limiting example, butyl acrylate, methyl methacrylate, styrene, benzyl methacrylate and the like and mixtures thereof, and optionally with lesser amounts of functional monomers such as, for non-limiting example, hydroxy propyl methacrylate, hydroxy ethyl acrylate, glycidyl methacrylate, acrylic acid, methacrylic acid, acetoacetoxy ethyl methacrylate, phosphate esters monomethacrylate and the like, and mixtures thereof. In some embodiments of the invention, the hydroxyl functional monomer is added at a level up to about 30% by weight of the ethylenically unsaturated monomer component mixture, the acid functional monomer is added at a level up to about 30% by weight of the ethylenically unsaturated monomer component mixture. In some embodiments, acetoacetoxy ethyl methacrylate is added at a level up to about 30% by weight of the ethylenically unsaturated monomer component mixture. Phosphate esters of monomethacrylates (such as Sipomer Pam-100, Pam-200 and Pam-400) can be added at a level up to about 20% by weight of the ethylenically unsaturated monomer component mixture. In some embodiments, about 10 to about 50% by weight of the ethylenically unsaturated monomer component mixture is an acid functional monomer. In some embodiments, the acid functional monomer is methacrylic acid.

The graft copolymer or the crosslinked graft copolymer may be inverted into water to form the coating composition by for example adding a neutralizing base, such as without limitation, ammonia or a tertiary amine such as without limitation, dimethyl ethanol amine, and water. Final NV (non-volatile content by weight) is about 15 to about 40% by weight in some embodiments.

The epoxidized vegetable oil can be used alone or in combination with other epoxidized vegetable oils. Epoxidized vegetable oils can be prepared from vegetable oils by, for non-limiting example, adding hydrogen peroxide and formic or acetic acid to the vegetable oil, and then holding the mixture at an elevated temperature until some or all of the carbon-carbon double bonds are converted to epoxide groups.

Vegetable oils contain primarily glycerides which are tri-esters of glycerol and fatty acids with varying degrees of unsaturation. For non-limiting example, epoxidized vegetable oils for use in the invention can be made from vegetable oils (fatty acid triglycerides) such as without limitation, esters of glycerol and fatty acids having an alkyl chain of about 12 to about 24 carbon atoms. Fatty acid glycerides which are triglycerides in unsaturated glyceride oils are generally referred to as drying oils or semidrying oils. Drying oils include, for non-limiting example, linseed oil, perilla oil and combinations thereof, while semidrying oils include, without limitation, tall oil, soy bean oil, safflower oil and combinations thereof. Triglyceride oils in some embodiments have identical fatty acid chains or alternatively have different fatty acid chains attached to the same glycerol molecule. In some embodiments, the oils have fatty acid chains containing non-conjugated double bonds. In some embodiments, single double bond or conjugated double bond fatty acid chains are used in minor amounts. Double bond unsaturation in glycerides can be measured by iodine value (number) which indicates the degree of double bond unsaturation in the fatty acid chains. Unsaturated fatty acid glyceride oils employed in some embodiments of the invention have an iodine value greater than about 25 and alternatively between about 100 and about 210.

Naturally occurring vegetable oils for use in the invention can be for non-limiting example, mixtures of fatty acid chains present as glycerides, and include without limitation a distribution of fatty acid esters of glyceride, where the fatty acid distribution may be random but within an established range that may vary moderately depending on the growing conditions of the vegetable source. Soybean oil is employed in some embodiments which comprises approximately about 11% palmitic, about 4% stearic, about 25% oleic, about 51% linolenic, and about 9% linoleic fatty acids, where oleic, linoleic and linolenic are unsaturated fatty acids. Unsaturated vegetable oils employed in some embodiments of the invention, include without limitation, glyceride oils containing non-conjugated unsaturated fatty acid glyceride esters such as, without limitation, linoleic and linolenic fatty acids.

Unsaturated glyceride oils include, without limitation, corn oil, cottonseed oil, rapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, and mixtures thereof. Fatty acid glycerides for use in the invention include, for non-limiting example, those which contain linoleic and linolenic fatty acid chains, oils such as without limitation, hempseed oil, linseed oil, perilla oil, poppyseed oil, safflower oil, soy bean oil, sunflower oil, canola oil, tall oil, grapeseed oil, rattonseed oil, corn oil, and similar oils which contain high levels of linoleic and linolenic fatty acid glyceride. Glycerides can contain lesser amounts of saturated fatty acids in some embodiments. For non-limiting example, soy bean oil can be employed which contains predominantly linoleic and linolenic fatty acid glycerides. Combinations of such oils are employed in some embodiments of the invention. Vegetable oils can by fully or partially epoxidized by known processes, such as for non-limiting example, using acids such as, without limitation, peroxy acid for epoxidation of unsaturated double bonds of the unsaturated vegetable oil. Unsaturated glyceride oils employed in some embodiments include mono-, di-glycerides and mixtures thereof with tri-glycerides or fatty acid esters of saturated and unsaturated fatty acids.

In some embodiments, the epoxidized vegetable oil comprises corn oil, cottonseed oil, grapeseed oil, hempseed oil, linseed oil, wild mustard oil, peanut oil, perilla oil, poppyseed oil, rapeseed oil, safflower oil, sesame oil, soy bean oil, sunflower oil, canola oil, tall oil, a fatty acid ester, monoglyceride or diglyceride of such oils, or a mixture thereof.

Commercially available sources of epoxidized vegetable oils are used in some embodiments of the invention such as, for non-limiting example, epoxidized soy oil sold under the trade designations "VIKOLOX" and "VIKOFLEX 7170" available from Arkema, Inc, "DRAPEX 6.8" available from Chemtura Corporation, and "PLAS-CHECK 775" available from Ferro Corp. Other epoxidized vegetable oils for use in the invention include, for non-limiting example, epoxidized linseed oil sold under the trade designations "VIKOFLEX 7190" available from Arkema, Inc. and "DRAPEX 10.4" available from Chemtura Corporation, epoxidized cotton seed oil, epoxidized carthamus oil and mixtures thereof. Epoxidized soy bean oil is employed in some embodiments.

In some embodiments of the invention, the hydroxyl functional material includes, without limitation, propylene glycol, ethylene glycol, 1,3-propane diol, neopentyl glycol, trimethylol propane, diethylene glycol, a polyether glycol, a polyester, a polycarbonate, a polyolefin, a hydroxyl functional polyolefin, and combinations thereof. The hydroxyl functional material includes an alcohol in some embodiments such as, without limitation, n-butanol, 2-ethyl hexanol, benzyl alcohol, and the like, alone, or in combination with diols or polyols.

In some embodiments, the hydroxyl functional material is present in an amount from about 1:99 to about 95:5 in a weight ratio of hydroxyl functional material to epoxidized vegetable oil, and alternatively from about 5:95 to about 40:60. In some embodiments, the equivalent ratio of hydroxyl functionality of the hydroxyl functional material to oxirane functionality in the epoxidized vegetable oil is from about 0.1:1 to about 3:1. In some embodiments, the equivalent ratio of hydroxyl functionality to oxirane functionality in the epoxidized vegetable oil is from about 0.2:1 to about 3:1. In some embodiments, the equivalent ratio of hydroxyl functionality to oxirane functionality in the epoxidized vegetable oil is about 0.2:1.

The acid catalyst can be without limitation a Lewis acid catalyst, a strong acid catalyst such as, for non-limiting example, one or more sulfonic acids or another strong acid (an acid with a pKa about 3 or less), a triflic acid, a triflate salt of a metal of Group IIA, IIB, IIIA, IIIB or VIIIA of the Periodic Table of Elements (according to the IUPAC 1970 convention), a mixture of said triflate salts, or a combination thereof. In some embodiments, the amount of acid catalyst can range from about 1 ppm to about 10,000 ppm, and alternatively from about 10 ppm to about 1,000 ppm, based on the total weight of the reaction mixture. Catalysts include, for non-limiting example, the Group IIA metal triflate catalysts such as without limitation magnesium triflate, the Group IIB metal triflate catalysts such as without limitation zinc and cadmium triflate, the Group IIIA metal triflate catalysts such as without limitation lanthanum triflate, the Group IIIB metal triflate catalysts such as without limitation aluminum triflate, and the Group VIIIA metal triflate catalysts such as without limitation cobalt triflate, and combinations thereof. The amount of each metal triflate catalyst can range, for non-limiting example, from about 10 to about 1,000 ppm, alternatively from about 10 to about 200 ppm, based on the total weight of the reaction mixture. Some embodiments of the invention employ a metal triflate catalyst in the form of a solution in an organic solvent. Examples of solvents include, without limitation, water, alcohols such as n-butanol, ethanol, propanol, and the like, as well as aromatic hydrocarbon solvents, cycloaliphatic polar solvents such as, for non-limiting example, cycloaliphatic ketones (e.g. cyclohexanone), polar aliphatic solvents, such as, for non-limiting example, alkoxyalkanols, 2-methoxyethanol, non hydroxyl functional solvents, and mixtures thereof.

In some embodiments, the epoxidized vegetable oil and hydroxyl functional material are heated in the presence of an acid catalyst to a temperature of about 50 to about 160° C. In some embodiments, a solvent is present during the reaction of the hydroxyl functional oil polyol with the functional polyolefin copolymer and the ethylenically unsaturated monomer component, such as for non-limiting example, a ketone such as, without limitation, methyl amyl ketone, an aromatic solvent such as, without limitation, xylene or Aromatic 100, an ester solvent or other non-hydroxyl functional solvent, and mixtures thereof. Up to about 50% of a solvent based on the total weight reaction mixture is employed in various embodiments of the invention, and alternatively about 5 to about 30% is employed. In some embodiments, about 10 to about 50% by weight of the ethylenically unsaturated monomer component mixture is an acid functional monomer. In some embodiments, the acid functional monomer is methacrylic acid. The coating composition may be inverted into water in some embodiments by adding a neutralizing base, such as without limitation, ammonia or a tertiary amine such as without limitation, dimethyl ethanol amine, 2-dimethylamino-2-methyl-1-propanol, tributylamine, water or a combination thereof. Final NV (non-volatile content by weight) is about 15 to about 40% by weight in some embodiments. In some embodiments, it is desirable to have a final NV (non-volatile content by weight) of about 30 to about 50 for some applications.

In some embodiments, a functional polyolefin copolymer and an ethylenically unsaturated monomer component are mixed with the hydroxyl functional oil polyol to form a mixture (optionally in the presence of an acid catalyst, such as the acid catalysts described above). In some embodiments, the functional polyolefin copolymer may include without limitation, polyethylene methacrylic acid, polyethylene acrylic acid, copolymers of ethylene and maleic anhydride, copolymers of propylene and maleic anhydride, and combinations thereof. Such copolymers may be Primacor 5980i available from Dow Chemical or Nucrel 925 available from DuPont. In some embodiments, epoxidized polybutadiene may include polybd600, polybd605, polybd600E, polybd700 and combinations thereof available from Cray Valley. The water dispersion may have a higher solids content and better stability in the presence of epoxidized polybutadiene.

In some embodiments, the acid functional monomer is methacrylic acid. The coating composition may be inverted into water in some embodiments by adding a neutralizing base, such as without limitation, ammonia or a tertiary amine such as without limitation, dimethyl ethanol amine, 2-dimethylamino-2-methyl-1-propanol, tributylamine, water, or a combination thereof. Final NV (non-volatile content by weight) is about 15 to about 40% by weight in some embodiments. In some embodiments, it is desirable to have a final NV (non-volatile content by weight) of about 30 to about 50 for some applications. For non-limiting example, the neutralizer may be employed in an amount from about 10% to about 150% based on of the amount of acid to be neutralized in the system.

The mixture may be reacted with an ethylenically unsaturated monomer component in the presence of an initiator to form a graft copolymer. The ethylenically unsaturated monomer component and the initiator can be added after the mixture is cooled. In some embodiments, the ethylenically unsaturated monomer component and initiator are added over about 2 hours. In some embodiments, the reaction product of the hydroxyl functional oil polyol, ethylenically unsaturated monomer component and initiator is cooled after about a 1 hour hold to form the graft copolymer. The term "acrylic" may be used to describe the graft copolymer as an acrylic graft copolymer, but the word acrylic is used in its broadest sense to include all ethylenically unsaturated monomer components.

The ethylenically unsaturated monomer component can be composed of a single monomer or a mixture of monomers. The ethylenically unsaturated monomer component includes, without limitation, one or more or a mixture of vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include without limitation, methyl vinyl ether, isopropyl vinyl ether, n-butyl vinyl ether, and isobutyl vinyl ether. Acrylic monomers include without limitation, monomers such as for non-limiting example, lower alkyl esters of acrylic or methacrylic acid having an alkyl ester portion containing between about 1 to about 10 carbon atoms, as well as aromatic derivatives of acrylic and methacrylic acid. Acrylic monomers include, for non-limiting example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, glycidyl acrylate and methacrylate, and amino acrylates and methacrylates.

In some embodiments, the weight ratio of the oil polyol to the functional polyolefin copolymer can be from about 80:20 to about 20:80, alternatively from about 40:60 to about 60:40, each based on total solids. In some embodiments, the weight ratio of the ethylenically unsaturated monomer component to the hydroxyl functional oil polyol to the functional polyolefin copolymer can be from about 80:10:10 to about 10:60:30, alternatively from about 70:15:15 to about 30:40:30, and alternatively from about 40:40:20 to about 50:30:20.

In some embodiments, the weight ratio of the oil polyol to the functional polyolefin copolymer to epoxidized polybutadiene can be from about 50:40:10 to about 89:10:1, alternatively from about 40:50:10 to about 75:20:5, each based on total solids. In some embodiments, the weight ratio of the ethylenically unsaturated monomer component to the hydroxyl functional oil polyol to the functional polyolefin copolymer to epoxidized polybutadiene can be from about 70:19:10:1 to about 20:40:30:10, alternatively from about 60:23:15:2 to about 63:35:20:8, and alternatively from about 40:35:20:5 to about 50:33:10:7.

In some embodiments, the weight ratio of the functional polyolefin copolymer to epoxidized polybutadiene can be from about 80:20 to about 50:50, alternatively from about 60:40 to about 60:40, each based on total solids. In some embodiments, the weight ratio of the ethylenically unsaturated monomer component to the epoxidized polybutadiene to the functional polyolefin copolymer can be from about 90:1:9 to about 20:20:60, alternatively from about 80:3:17 to about 55:15:32, and alternatively from about 75:4:21 to about 70:10:20.

Various initiators are employed alone or in combination in some embodiments of the invention. In some embodiments, initiators with high grafting efficiencies are employed. The initiator includes without limitation, azo compounds such as for non-limiting example, 2,2'-azo-bis(isobutyronitrile), 2,2'-azo-bis(2,4-dimethylvaleronitrile), and 1-t-butyl-azocyanocyclohexane), hydroperoxides such as for non-limiting example, t-butyl hydroperoxide and cumene hydroperoxide, peroxides such as for non-limiting example, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, 1,1,3,3-tetramethylbutyl-peroxy-2-ethylhexanoate, and t-butylperoxy pivilate, peresters such as for non-limiting example, t-butyl peracetate, t-butyl perphthalate, and t-butyl perbenzoate, as well as percarbonates, such as for non-limiting example, di(1-cyano-1-methylethyl)peroxy dicarbonate, perphosphates, t-butyl peroctoate, and the like and mixtures thereof. In some embodiments, the initiator is present in an amount from about 0.1 to about 15%, and alternatively from about 1 to about 5%, based on the weight of the monomer mixture.

The temperature chosen for grafting the ethylenically unsaturated monomer component may vary with the half life of the selected initiator in some embodiments on the invention. For non-limiting example, at 130° C. t-butyl peroxy benzoate has a half life of about 30 minutes and can be employed for grafting. Dibenzoyl peroxide has a 30 minute half life at 100° C., and 100° C. could be a temperature to graft the hydroxyl functional oil polyol with dibenzoyl peroxide in some embodiments of the invention. Broadly, depending on the half life of the initiator used, the reaction can be carried out from about 50 to about 200° C.

In some embodiments, one or more mixtures of an initiator with or without a solvent is added after formation of the hydroxyl functional oil polyol acrylic graft copolymer to reduce the free monomer content. The compositions of the initiator and solvent in these one or more mixtures can be the same as or different than the compositions of these components used to form the hydroxyl functional oil polyol acrylic graft copolymer.

In some embodiments, the coating composition is inverted into water by adding a mixture of a neutralizing base and water. The coating composition can be crosslinked by a functional epoxy compound or a functional epoxy polymer to from crosslinked particles to improve retort resistance. The crosslinker can be an aliphatic epoxy such as without limitation, ethylene glycol diglycidyl ether, 1,4-butanediol diglycidyl ether, 1,4 cyclohexanedimethanol diglycidyl ether, diepoxidized polyglycol, polyglycol diglycidyl ether, 1,6 hexanediol diglycidyl ether, trimethylolpropane triglycidyl ether, trimethylolethane triglycidyl ether, propoxylated glycerin triglycidyl ether, cycloaliphatic epoxy, sorbital glycidyl ether, or a combination thereof. Functional epoxidized polymers can be used as a crosslinker such as without limitation, epoxidized vegetables, epoxidized polybutadiene, epoxidized polyols, synthesized polyglycidyl (meth)acrylate copolymers, and combinations thereof.

In some embodiments, the graft copolymer is mixed with a crosslinker to form a curable coating composition. The crosslinked coating composition may provide excellent film performance at very short baking for coil applications. A non-limiting list of crosslinkers for use in the invention includes bisphenol-A free epoxides, a glycidyl methacrylate copolymer, epoxidized sorbitol, benzoguanamine, benzoguanamine formaldehyde, glycoluril, melamine formaldehyde, a phenolic crosslinker, phenol formaldehyde, urea formaldehyde, an isocyanate, a blocked isocyanate, Sakuranomiya Chemical Company's MC-16, Cytec's EP-560, PH2028, PH2013/65B, PR899/60 MPC, Hexion's PF6535LB, SI Group's SFC112/65, Ruters's 7700 LB, and mixtures thereof. In some embodiments, a glycidyl methacrylate copolymer is used as the crosslinker to help improve the retort and chemical resistance. The composition of the crosslinker copolymer can include without limitation styrene, acrylate, methacrylate, functional (meth)acrylates, acrylic monomers including without limitation, lower alkyl esters of acrylic or methacrylic acid having an alkyl ester portion containing between about 1 to about 10 carbon atoms, aromatic derivatives of acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, glycidyl acrylate and methacrylate, and amino acrylates and methacrylates. The temperature chosen for crosslinking the copolymer of the ethylenically unsaturated monomer component may vary with the half life of the selected initiator in some embodiments on the invention. For non-limiting example, at 130° C. t-butyl peroxy benzoate has a half life of about 30 minutes and can be employed for grafting. Dibenzoyl peroxide has a 30 minute half life at 100° C., and 100° C. could be a temperature to graft the hydroxyl functional oil polyol with dibenzoyl peroxide in some embodiments of the invention. Broadly, depending on the half life of the initiator used, the reaction can be carried out from about 50 to about 130° C.

In various embodiments, the crosslinker to graft copolymer ratio is about 1:99 to about 90:10, and alternatively about 10:90 to about 70:30. Optionally, the mixture of polymers and crosslinker can occur in the presence of a cure catalyst. Cure catalysts include, for non-limiting example, dodecyl benzene sulfonic acid, p-toluene sulfonic acid, phosphoric acid, and the like and mixtures thereof. In some embodiments, other polymers may be blended into the coating composition, such as without limitation, polyethers, polyesters, polycarbonates, polyurethanes and the like, as well as mixtures thereof. Cure conditions for packaging coatings in some embodiments are about 10 to about 60 seconds at about 500° F. to about 600° F., and alternatively about 1 minute to about 20 minutes at about 250° F. to about 500° F.

The copolymers and the coating compositions of the invention can include conventional additives known to those skilled in the art, such as without limitation, flow agents, surface active agents, defoamers, anti-cratering additives, lubricants, meat-release additives, and cure catalysts.

In some embodiments of the invention, one or more coating compositions are applied to a substrate, such as for non-limiting example, cans, metal cans, easy-open-ends, packaging, containers, receptacles, can ends, or any portions thereof used to hold or touch any type of food or beverage. In some embodiments, one or more coatings are applied in addition to the coating compositions of the present invention, such as for non-limiting example, a prime coat may be applied between the substrate and the coating composition.

The coating compositions can be applied to substrates in any manner known to those skilled in the art. In some embodiments, the coating compositions are sprayed or roll coated onto a substrate.

When applied, the coating compositions contain, for non-limiting example, between about 10% and about 30% by weight polymeric solids relative to about 70% to about 90% water, including other volatiles such as, without limitation, minimal amounts of solvents, if desired. For some applications, typically those other than spraying, solvents contained in coating composition to help the film formation are for non-limiting example, between about 10% and about 40% by weight polymer solids. Organic solvents are utilized in some embodiments to facilitate roll coating or other application methods and such solvents can include, without limitation, n-butanol, 2-butoxy-ethanol-1, xylene, propylene glycol, N-butyl cellosolve, diethylene glycol monoethyl ether and other aromatic solvents and ester solvents, and mixtures thereof. In some embodiments, N-butyl cellosolve is used in combination with propylene glycol. The resulting coating compositions are applied in some embodiments by conventional methods known in the coating industry. In some embodiments, after application onto a substrate, the coating composition is thermally cured at temperatures in the range of about 200° C. to about 250° C.

The coating compositions of the present invention can be pigmented and/or opacified with known pigments and opacifiers in some embodiments. For many uses, including food use for non-limiting example, the pigment can be zinc oxide, carbon black, or titanium dioxide. The resulting coating compositions are applied in some embodiments by conventional methods known in the coating industry. Thus, for non-limiting example, spraying, rolling, dipping, and flow coating application methods can be used for both clear and pigmented films. In some embodiments, after application onto a substrate, the coating composition is thermally cured at temperatures in the range of about 130° C. to about 250° C., and alternatively higher for time sufficient to effect complete curing as well as volatilizing any fugitive components.

For substrates intended as beverage containers, the coating are applied in some embodiments at a rate in the range from about 0.5 msi to about 15 milligrams per square inch of polymer coating per square inch of exposed substrate surface. In some embodiments, the water-dispersible coating is applied at a thickness between about 0.1 msi and about 1.15 msi.

For substrates intended as beverage easy-open-ends, the coating are applied in some embodiments at a rate in the range from about 1.5 to about 15 milligrams per square inch of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body. When used as a coating for the easy-open-end of a metal container, the coatings of the invention exhibit resistance to retorted beverages, acidified coffees, isotonic drinks, and the like. In some embodiments, the solids content of the coating composition is greater than about 30% and the coating composition has a viscosity from about 35 to about 200 centipoise at 30% solids or above to produce a film weight of about 6 to about 8 msi (milligrams per square inch) so that over blister is minimized and so that the film can have good chemical resistance, such as aluminum pick-up resistance. Some of the coating compositions of the current invention can be used for both inside and outside easy-open-end applications.

EXAMPLES

The invention will be further described by reference to the following non-limiting examples. It should be understood that variations and modifications of these examples can be made by those skilled in the art without departing from the spirit and scope of the invention.

Blush resistance measures the ability of a coating to resist attack by various solutions. Typically, blush is measured by the amount of water absorbed into a coated film. When the film absorbs water, it generally becomes cloudy or looks white. The coating compositions were evaluated with deionized water retort (90 minutes immersed into water at 250° F.). Retort blush was measured visually on a scale of 0-5. A blush of 0 means that there is no blush. A blush of 5 means that the film is completely white.

Solvent resistance is measured as a resistance to solvents, such as methyl ethyl ketone (MEK) or acetone. This test was performed as described in ASTM D 5402-93. The numbers of double-rubs (i.e. one back-and forth motion) is reported. MEK was used in the current tests.

Beaded Ericksen cup fabrication measures the ability of a coated substrate to retain its integrity as it simulates the formation process to produce a beverage can end. It is a measure of the presence of cracks or fractures in the beads. 1×1 inch drown cups were made by Ericksen Cupper.

Adhesion testing was performed on the beaded Ericksen cups to assess whether the coating adheres to the cups. The adhesion test was performed according to ASTM D 3359-Test Method B, using SCOTCH 610 tape, available from 3M Company of Saint Paul, Minn. Adhesion is generally rated on a scale of 0-5 where a rating of "0" indicates no adhesion failure and a rating of "5" indicates that film was completely off the substrate.

Blisters were measured by MEIJI Techno Microscopes and referenced by ASTM D714. The blisters were rated by none, a few or dense in this application.

Water blush was measured by the amount of water absorbed into the coated film when the film was immersed into water. Water vapor blush was measured. The coating compositions were evaluated with deionized water retort (90 minutes immersed into water at 250° F.). Retort blush was measured using a Waco Enamel Rater. Coated can ends were placed on the Waco Enamel Rater to test the coverage of the coating on beverage cans. This test displays an index of the amount of metal exposed by incomplete enamel coverage on a clear, easily-readable digital LED. When the can is inverted, the electrode and can end become immersed in the electrolyte and the reading is displayed on the Enamel Rater.

Copper chloride resistance was used to measure the ability of the coated substrate after water retort to retain its integrity as it undergoes a formation process to produce a beverage can-end. In this test, the fabricated can ends were exposed to a copper chloride solution. Copper will deposit in any creaks or fractures that may exist in the end. A copper sulfate testing solution was prepared with 2070 grams of water, 600 grams of copper sulfate, 300 grams of hydrochloric acid and 30 grams of Dowfax 2A1. The copper sulfate was dissolved in the distilled water in a 4000 ml beaker, then the hydrochloric acid and Dowfax 2A1 were added. The testing procedure was: (1) fill the tray to a depth of ½ inch with the copper sulfate solution; (2) float the ends with the interior side down on the solution; (3) set the timer for 30 minutes; and (4) after 30 minutes has elapsed, remove the ends and dip into a container of tap water. Blush was measured visually using on a scale of 0-5. A blush of 0 means that there was no copper chloride stain at the end. A blush of 5 means that the film was completely stained by copper chloride.

A 2% citric acid test was used to simulate ac acidic beverage. The can-ends were immersed into the 2% citric acid solution for 60 minutes at 250° F. The test results are summarized below. Retort blush and adhesion was measured in the same manner as the above examples.

Example 1

Preparation of Hydroxyl Functional Oil Polyol 47 grams of propylene glycol, 250 grams of epoxidized soy bean oil, 0.57 grams of butanol and 0.11 grams of Nacure Super A-218 (available from King Industries) were stirred under nitrogen and heated to 140° C. The initial exotherm was controlled and the mixture was held at 150° C. for about 2 hours. The epoxy equivalent weight was 36,648. The mixture was cooled to 100° C. and 345 grams of butyl cellosolve was added. The final solid is 47.2%.

Example 2

Preparation of Hydroxyl Functional Oil Polyol 76.38 grams of propylene glycol, 335 grams of epoxidized soy bean oil, 0.5 grams of butanol and 0.1 grams of Nacure Super A-218 (available from King Industries) were stirred under nitrogen and heated to 140° C. The initial exotherm was controlled and the mixture was held at 150° C. for about 2 hours. The epoxy equivalent weight was 34,720. The mixture was cooled to 100° C. The final solid is 90%.

Example 3

Preparation of Glycidyl Methacrylate Copolymer Crosslinker 80 grams of diethylene glycol monoethyl ether and 0.83 grams of tert-butyl peroctoate were heated to 100° C. in a reactor. 30 grams of glycidyl methacrylate, 35 grams of butyl acrylate, 35 grams of methyl methacrylate and 4.2 grams of tert-butyl peroctoate were pumped into the reactor over 3 hours. Next, 1.0 grams of tert-butyl peroctoate and 5 grams of diethylene glycol monoethyl ether were added to the reactor and held for 1 hour. Next, 1.0 grams of tert-butyl peroctoate and 5 grams of diethylene glycol monoethyl ether were added to the reactor and held for 30 minutes. Finally, 9 grams of diethylene glycol monoethyl ether was added to the reactor and the reactor was cooled to 50° C. The final solids content was 50%.

Example 4

Preparation of Graft Copolymer 20 grams of Primacor 5980i, 10 grams of polybd600E available from Cray Valley), 58 grams of butyl cellosolve, 0.5 grams of butanol and 0.04 grams of Nacure Super A-218 (available from King Industries) were stirred under nitrogen and heated to 120° C. The initial exotherm was controlled and the mixture was held at 120° C. for about 1 hours. The epoxy equivalent weight was 35,420. The mixture was cooled to 100° C. and 24 grams of butanol was added. Next, 27.5 grams of methyl methacrylate, 27.5 grams of n-butyl methacrylate, 7 grams of hydroxypropyl methacrylate, 8 grams of methacrylic acid, 7 grams of butyl cellosolve and 2.0 grams of Aztec benzoyl peroxide (75% in water) were fed into the mixture at 100° C. over 2.5 hours. Next, 0.3 grams of t-butyl peroctoate was added and held for 1.0 hours at 100° C. Next, 0.3 grams of t-butyl peroctoate was added and held for 1.0 hours at 100° C. Next, the reactor was cooled to 95° C. Next, 4.5 grams of dimethylethanolamine and 10 grams of deionized water were added and held for 20 minutes. Next, 365 grams of deionized water was pumped into the reactor at 90° C. for 45 minutes. Next, the reactor was cooled to 40° C. The final solids content was 17.8%.

Example 5

Preparation of Graft Copolymer 71 grams of the Hydroxyl Functional Oil Polyol prepared in Example 1 was mixed with 14.2 grams of Primacor 5980i. The mixture was heated to 120° C. and held for two hours. The mixture was cooled to 100° C. after a two hour hold. 24 grams of butanol was added to the reactor. 17 grams of methyl methacrylate, 17 grams of n-butyl methacrylate, 5 grams of hydroxypropyl methacrylate, 10 grams of methacrylic acid, 17 grams of butyl cellosolve and 1.5 grams of Aztec benzoyl peroxide (75% in water) were mixed in a separate container and fed into the mixture at 100° C. over 2.5 hours. Next, 0.7 grams of t-butyl peroctoate and 7 grams of butyl cellosolve were added and held for 1.5 hours at 100° C. Next, the reactor was cooled to 95° C. Next, 5.5 grams of dimethylethanolamine and 10 grams of deionized water were added and held for 30 minutes. Next, 190 grams of deionized water was pumped into the reactor and the reactor was held at 95° C. for 45 minutes. Next, the reactor was cooled to 50° C. The final solids content was 25.5%.

Example 6

Preparation of Coating Compositions

The four coating compositions shown in Table 1 below were formulated with various solvent, crosslinkers and wax. The resulting films were coated on 211 TFS substrates using a 12 number rod which produced 2.0-2.5 msi film thicknesses. The coating film was cured at peak temperature of 235° C. for 17 seconds.

TABLE 1

| (Coating Compositions) | | | | |
|---|---|---|---|---|
|  | Comp 1 | Comp 2 | Comp 3 | Comp 4 |
| Example 4 | 55.5 grams | 55.5 grams | 55.5 grams | 0 |
| Example 5 | 0 | 0 | 0 | 39.2 grams |
| Cymel 303 LF | 1.0 grams | 0 | 0 | 0 |
| EP-560 phenolic | 0 | 2.8 grams | 0 | 2.8 grams |
| Cymel 156 resin | 0 | 0 | 2.0 grams | 0 |
| Catalyst Dodecylbenzenesulfonic acid | 0.15 grams | 0.15 grams | 0.15 grams | 0.15 grams |
| Water retort blush | 1 | 0 | 1 | 2 |
| MEK rub | 50 | 50 | 25 | 20 |
| Beaded Ericksen cup | OK | OK | OK | OK |

Example 7

Preparation of Graft Copolymer with Crosslinkers 47 grams of the Hydroxyl Functional Oil Polyol prepared in Example 2 was mixed with 33 grams of Primacor 5980i, 5 grams of epoxidized polybutadiene polybd600, 52 grams of diethylene glycol monoethyl ether and 40 grams of propylene glycol. The mixture was heated to 120° C. and held for two hours. The mixture was cooled to 100° C. after a two hour hold. 43.4 grams of methyl methacrylate, 6.6 grams of n-butyl methacrylate, 6.6 grams of hydroxypropyl methacrylate, 9.9 grams of methacrylic acid and 3.3 grams of Aztec t-benzoyl peroxide were mixed in separated container and fed into the mixture at 100° C. over 2.5 hours. Next, 1.0 grams of t-butyl peroctoate was added and held for 1.5 hours at 100° C. Next, the reactor was cooled to 95° C. Next, 4 grams of dimethylethanolamine and 25 grams of deionized water were added and held for 30 minutes. The reactor was cooled to 90° C. 38.5 grams of the crosslinker from Example 3 was added into the reactor. Next, a mixture of 23 grams of phenolic EP-560 (10% based on total solid), 0.5 grams of dimethylethanolamine and 4 grams of propylene glycol was added into reactor. The reactor was heated to 90° C. Next, 160 grams of deionized water was pumped into the reactor over 30 minutes. The reactor was held at 90° C. and for 45 minutes after water was pumped. Next, the reactor was cooled to 40° C. The final solids content was 36%.

Example 8

Preparation of Graft Copolymer with Crosslinkers 47 grams of the Hydroxyl Functional Oil Polyol prepared in Example 2 was mixed with 33 grams of Primacor 5980i, 5 grams of epoxidized polybutadiene polybd600, 52 grams of diethylene glycol monoethyl ether and 40 grams of propylene glycol. The mixture was heated to 120° C. and held for two hours. The mixture was cooled to 100° C. after a two hour hold. 43.4 grams of methyl methacrylate, 6.6 grams of n-butyl methacrylate, 6.6 grams of hydroxypropyl methacrylate, 9.9 grams of methacrylic acid and 3.3 grams of Aztec t-benzoyl peroxide were mixed in separated container and fed into the mixture at 100° C. over 2.5 hours. Next, 1.0 grams of t-butyl peroctoate was added and held for 1.5 hours at 100° C. Next, the reactor was cooled to 95° C. Next, 4 grams of dimethylethanolamine and 25 grams of deionized water were added and held for 30 minutes. The reactor was cooled to 90° C. 38.5 grams of the crosslinker from Example 3 was added into reactor. Next, a mixture of 34.3 grams of phenolic EP-560 (15% based on solids), 0.8 grams of dimethylethanolamine and 6.0 grams of propylene glycol was added into reactor. The reactor was heated to 90° C. Next, 180 grams of deionized water was pumped into the reactor over 30 minutes. The reactor was held at 90° C. and for 45 minutes after the water was pumped in. Next, the reactor was cooled to 40° C. The final solids content was 35.4%.

The graft copolymer from Example 7 and the graft copolymer from Example 8 were coated on 211 TFS substrates using a 28 number rod which produced 6.5-7.0 msi film thicknesses. The panels were fabricated into 202 shells on a one-out Shell Press and converted into 202 beverage ends. The ends were evaluated in several tests and the results are summarized in Table 2.

TABLE 2

|  | Example 7 | Example 8 |
|---|---|---|
| Retort @ 250 F. with water vapor (Enamel Rater) | 14.5 | 41.83 |
| Water retort immersed 90 mins @ 250 F. (Enamel Rater) | 28.3 | 32.4 |
| Metal exposure of copper sulfate 30 minutes blush resistance | | |
| Panel wall | 1 | 0 |
| Rivet | 2 | 2 |
| Score | 4 | 2 |
| 2% citric acid 60 mins @ 250 F. | | |
| Blush | 2 | 1 |
| Blisters | No | No |
| adhesion | <1 | 0 |

What is claimed is:
1. A coating composition comprising:
a crosslinker; and
a graft copolymer that is thermally reactive with the crosslinker, wherein the graft copolymer is a reaction product, formed in the presence of an initiator, of an ethylenically unsaturated monomer and a mixture of a hydroxyl functional oil polyol and a functional polyolefin copolymer, and wherein the hydroxyl functional oil polyol is a reaction product, formed in the presence of an acid catalyst, of an epoxidized vegetable oil and a hydroxyl functional material.

2. The coating composition of claim 1, wherein the epoxidized vegetable oil is derived from an unsaturated fatty acid glyceride.

3. The coating composition of claim 1, wherein the epoxidized vegetable oil is present in an amount from about 1 to about 95 parts based on the total weight of the graft copolymer.

4. The coating composition of claim 1, wherein the hydroxyl functional material is at least one of propylene glycol, 1,3-propane diol, ethylene glycol, neopentyl glycol, trimethylol propane, diethylene glycol, a polyether glycol, benzyl alcohol, 2-ethyl hexanol, a polyester, a polycarbonate, or a hydroxyl functional polyolefin.

5. The coating composition of claim 1, wherein the hydroxyl functional material is present in an amount of from about 1 to about 95 parts of the epoxidized vegetable oil.

6. The coating composition of claim 1, wherein the weight ratio of the hydroxyl functional oil polyol to the functional polyolefin copolymer is from about 80:20 to about 20:80 based on total solids.

7. The coating composition of claim 1, wherein the acid catalyst includes at least one of a sulfonic acid, a triflic acid, or a triflate salt of a metal of Group IIA, IIB, IIIA, IIIB or VIIIA of the Periodic Table of Elements (according to the IUPAC 1970 convention).

8. The coating composition of claim 1, wherein the weight ratio of the ethylenically unsaturated monomer component to the hydroxyl functional oil polyol to the functional polyolefin is from about 80:10:10 to about 10:60:30.

9. The coating composition of claim 1, wherein the mixture of the hydroxyl functional oil polyol and the functional polyolefin includes a reaction product of the hydroxyl functional oil polyol, the functional polyolefin, and epoxidized butadiene.

10. The coating composition of claim 9, wherein the weight ratio of the hydroxyl functional oil polyol to the functional polyolefin copolymer to the epoxidized polybutadiene is from about 50:40:10 to about 89:10:1.

11. The coating composition of claim 9, wherein the weight ratio of the ethylenically unsaturated monomer component to the hydroxyl functional oil polyol to the functional polyolefin copolymer to the epoxidized polybutadiene is from about 70:19:10:1 to about 20:40:30:10.

12. The coating composition of claim 1, wherein the ethylenically unsaturated monomer component includes at least one of butyl acrylate, methyl methacrylate, styrene, benzyl methacrylate, hydroxy propyl methacrylate, hydroxy ethyl acrylate, glycidyl methacrylate, acrylic acid, methacrylic acid, acetoacetoxy ethyl methacrylate, or a phosphate ester monomethacrylate.

13. The coating composition of claim 1, wherein the initiator includes at least one of t-butyl peroxy benzoate, t-butyl peroctoate or dibenzoyl peroxide, 1,1,3,3-tetramethylbutyl-peroxy-2-ethylhexanoate.

14. The coating composition of claim 1, wherein the initiator is present in an amount from about 0.1 to about 15 wt % of the ethylenically unsaturated monomer component.

15. The coating composition of claim 1, wherein the hydroxyl functional oil polyol is formed in the presence of a solvent.

16. The coating composition of claim 15, wherein the solvent comprises up to about 90% based on the total weight of the reaction mixture.

17. The coating composition of claim 1, wherein the crosslinker includes at least one of phenol-formaldehyde, melamine formaldehyde, urea formaldehyde, benzoguanamine formaldehyde, an isocyanate, a blocked isocyanate, a bisphenol-A free epoxide, a phenolic crosslinker, a glycidyl (meth)acrylate copolymer, epoxidized sorbitol, benzoguanamine, or glycoluril.

18. The coating composition of claim 1, wherein the functional polyolefin copolymer is at least one of a copolymer of ethylene and methacrylic acid, a copolymer of ethylene and acrylic acid, a copolymer of ethylene and maleic anhydride, or a copolymer of propylene and maleic anhydride.

19. A substrate coated with the coating composition of claim 1.

20. The coating composition of claim 1, wherein the graft copolymer is inverted in water.

* * * * *